United States Patent
Crosswy et al.

[15] 3,695,761
[45] Oct. 3, 1972

[54] PHOTOMULTIPLIER FOR A LASER VELOCIMETER

[72] Inventors: Frank L. Crosswy, Tullahoma; Henry T. Kalb, Manchester, both of Tenn.

[73] Assignee: The United States of America as represented by the Secretary of the United States Air Force

[22] Filed: July 31, 1970

[21] Appl. No.: 59,964

[52] U.S. Cl. ............356/28, 315/11, 250/199, 250/207, 307/271
[51] Int. Cl. ........H01j 39/12, H04b 9/00, G01p 3/36
[58] Field of Search ...315/11; 250/199, 207; 356/28, 356/29, 4, 5; 307/271

[56] References Cited

UNITED STATES PATENTS

| 3,573,463 | 6/1971 | Goodwin et al. | 250/199 |
| 3,446,971 | 5/1969 | Ruddock | 250/199 |
| 3,242,487 | 3/1966 | Hammack | 343/7 RS |

Primary Examiner—Benjamin A. Borchelt
Assistant Examiner—S. C. Buczinski
Attorney—Harry A. Herbert, Jr. and George Fine

[57] ABSTRACT

A photomultiplier (PM) tube for a laser velocimeter in which electrodes are utilized in conjunction with a local oscillator signal to permit frequency heterodyning to extend the useful frequency response range of the photomultiplier tube. The heterodyne PM tube is then used as a component in a superheterodyne type signal conditioning instrument for a doppler shift laser velocimeter (LV).

2 Claims, 3 Drawing Figures

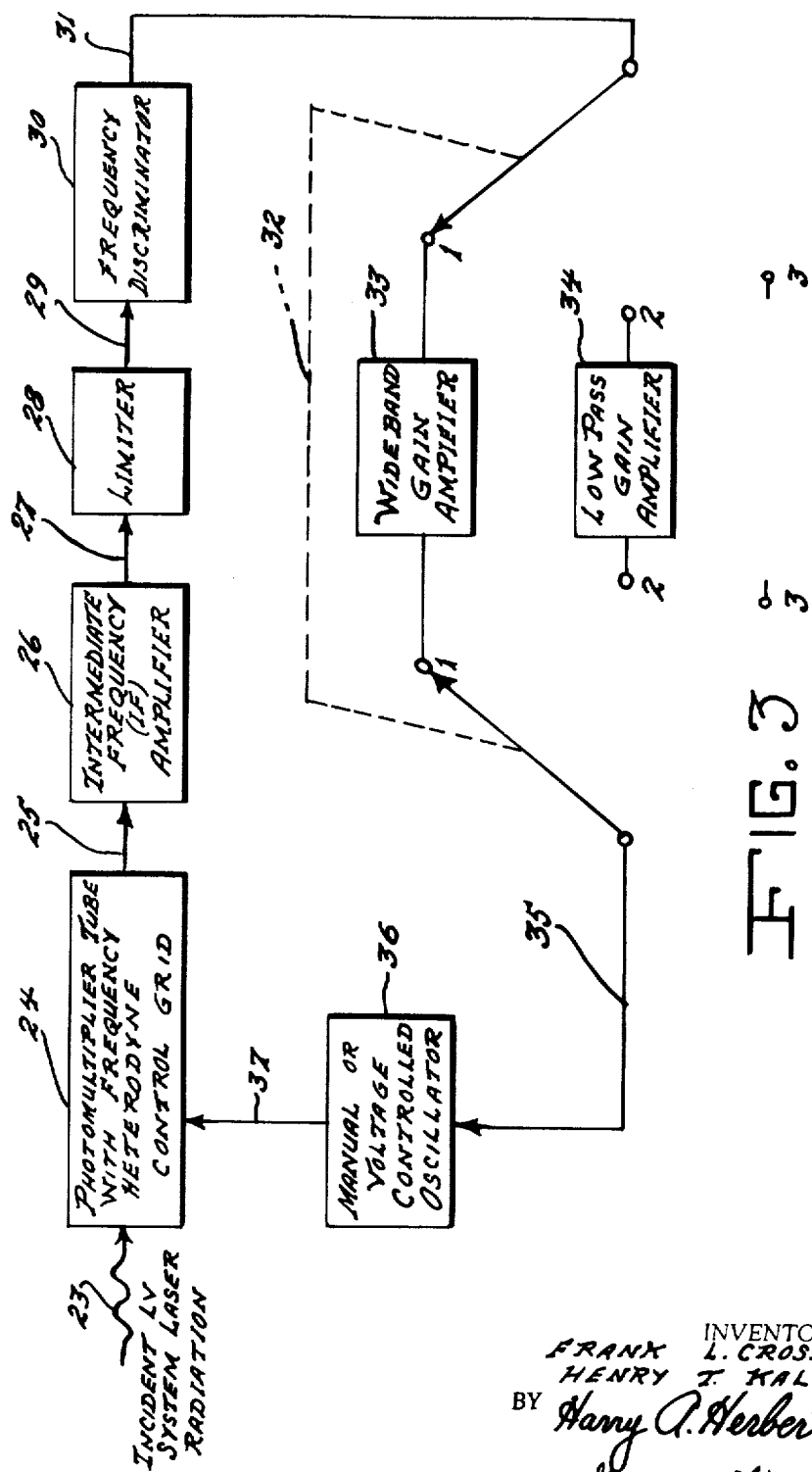

PHOTOMULTIPLIER FOR A LASER VELOCIMETER

BACKGROUND OF THE INVENTION

This invention relates to photomultiplier tubes and more particularly a photomultiplier tube arranged to provide frequency heterodyning with the heterodyning photomultiplier tube utilized as a component in a superheterodyne signal conditioning instrument for a doppler shift laser velocimeter.

The doppler shift laser velocimeter (LV) produces a sinusoidal signal or spectrum of signals at the output of a photomultiplier tube whose frequency or frequencies are directly proportional to the velocity of light scattering particles passing though the laser velocimeter probe volume. As the particle velocities increase the photomultiplier tube output increases. The photomultiplier tube anode load resistance-stray capacitance time constant (R-C time constant) limits the upper usable frequency. Depending upon the particular photomultiplier tube and the anode load resistor, this upper usable frequency range for a conventionally utilized photomultiplier tube may typically be in the range from several megahertz to several hundred megahertz.

For laser velocimeter system signals beyond several hundred megahertz, the usual practice is to remove the conventional photomultiplier tube and replace it with a microwave response photomultiplier tube, and the changeover procedure is quite inconvenient. In the present invention, the use of frequency heterodyning techniques with photomultiplier tubes permit the use of a single photomultiplier tube to cover the frequency range from zero to the order of one gigahertz and thereby also extend the useful velocity range for laser doppler volocimeters.

SUMMARY OF THE INVENTION

A photomultiplier tube for a laser velocimeter is provided wherein an oscillator signal originating external to but injected into the photomultiplier tube is frequency heterodyned with an input signal to the tube to maintain a difference frequency (IF) signal within the usable frequency band dictated by the anode load R-C time constant of the tube.

A control grid structure either internal or external to the photomultiplier is suitably biased and then driven by an external oscillator to accomplish the frequency heterodyning process. The frequency heterodyning technique can be exploited to extend the useful frequency range of an other wise conventional photomultiplier tube.

The photomultiplier tube with a frequency control grid may be utilized in a superheterodyne circuit to accommodate laser velocimeter system signals over the frequency range from zero hertz to the order of 1 gigahertz. Still further, a superheterodyne circuit incorporating the heterodyne photomultiplier tube could also be used as a communications receiver wherein modulated electromagnetic radiation in the spectral sensitivity range of the photomultiplier tube is used to convey information.

There is also provided a photomultiplier tube with heterodyne control grid incorporated into a superheterodyne type signal conditioning instrument. The superheterodyne instrument is useful for laser velocimeter system signal conditioning since outputs are available for determination of the average frequency of the input signal, the frequency deviation about the average, and the frequency deviation rate. These three parameters are required for calculation of certain turbulent flow parameters (i.e., turbulence intensity and scale of turbulence).

An object of this invention is to provide a photomultiplier tube having a control electrode associated therewith and being driven by an external oscillator to accomplish a frequency heterodyning process with an input signal to the tube.

Still another object of this invention is to provide a photomultiplier tube with an associated frequency heterodyne control grid incorporated in a superheterodyne circuit to accommodate laser velocimeter system signals over a frequency range zero hertz to the order of 1 gigahertz.

DESCRIPTION OF THE DRAWINGS

FIG. 3 is a schematic block diagram of the superheterodyne signal conditioning instrument incorporating the photomultiplier tube with an electrode to accommodate frequency heterodyning within the tube.

DETAILED DESCRIPTION OF THE PREFERRED EMBODIMENTS

Figure 1:
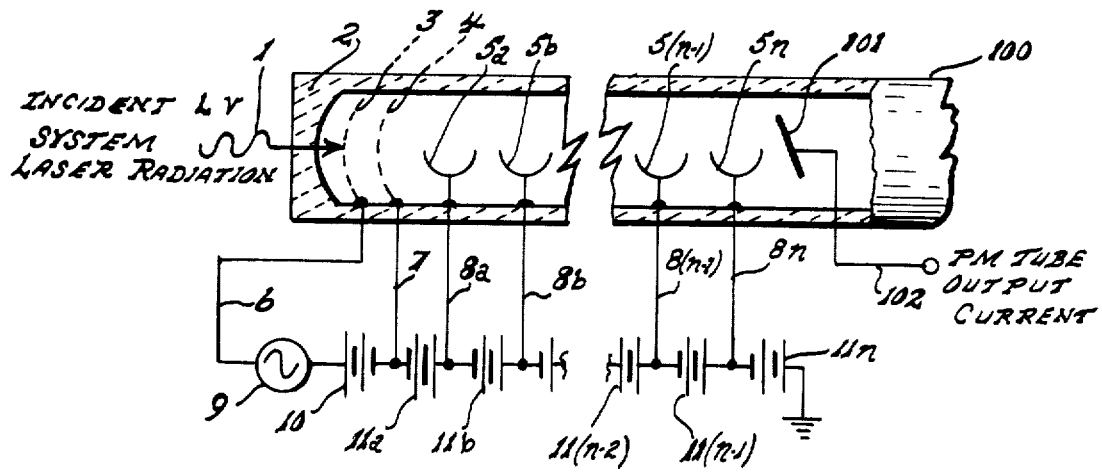
FIG. 1 shows a cutaway view of a portion of a photomultiplier tube illustrating the electrode (control grid) and photocathode geometries required to produce frequency heterodyning in the photomultiplier tube.

Referring now to FIG. 1, the incident laser velocimeter system laser radiation 1 passes through photomultiplier (PM) tube glass envelope 2 and impinges upon the photocathode 3. A portion of the incident radiation has been doppler shifted in optical frequency because of a previous scattering interaction with a moving particle in the fluid flow of interest. A second portion of the incident radiation consists either (depending upon the particular LV system optical design) of non-doppler shifted radiation or radiation shifted an equal but opposite frequency increment compared to the first portion. In either case, the radiations incident upon photocathode 3 produce a stream of photoemitted electrons. Optical frequency heterodyning of the radiations at the photocathode causes the photoemitted electron current to vary sinusoidally with a frequency equal to the doppler shift and, therefore, proportional to the scatter particle velocity.

For conventional use of the photomultiplier tube 100, the photoemitted electrons stream would pass through the tube and impinge upon first dynode 5a. However, for the situation shown in FIG. 1, control grid 4 is placed inside the PM tube and an electric field established between control grid 4, and photocathode 3 can be used to amplitude modulate the photoelectron stream before it reaches dynode 5a. The remainder of the PM tube contains additional dynode stages for amplification of the photoelectron current. A lead 6 is electrically connected to photocathode 3 and passes through the glass wall 2 of the PM tube and attaches to signal generator 9. Signal generator 9 is connected to the positive side of bias voltage source 10. The negative side of bias voltage source 10 is connected to lead 7 which passes through the PM tube glass wall 2 and is electrically connected to control grid 4. Lead 7 is also connected to the negative terminal of bias voltage source 11a. The positive terminal of bias voltage source 11a is connected to lead 8a. Lead 8a passes through PM tube wall 2 and is electrically connected to first dynode 5a of the PM tube. Because of bias voltage source 10, the control grid tends to repel the photoelectrons ejected from the photocathode 3. Also, signal generator 9 will cause control grid 4 to alternately attract and repel the photoelectrons. This amplitude modulation of the photoelectron stream produces a signal (IF signal) whose frequency is equal to the difference between the photoelectron stream frequency and the signal generator 9 preselected frequency. By varying the signal generator frequency selections, the IF signal frequency can be maintained within the usable frequency range of the conventional PM tube. It is to be noted that photomultiplier tube 100 is conventional except for the insertion of control grid 4. Thus it also includes other secondary dynodes 5a to 5n and anode 101 to provide the output signal. There is also provided the conventional voltage sources 11a through 11n for the secondary dynodes and anode.

For high frequency operation the two leads 6 and 7, as well as the two electrodes 3 and 4, must be geometrically designed to minimize characteristic impedance mismatch.

Figure 2:
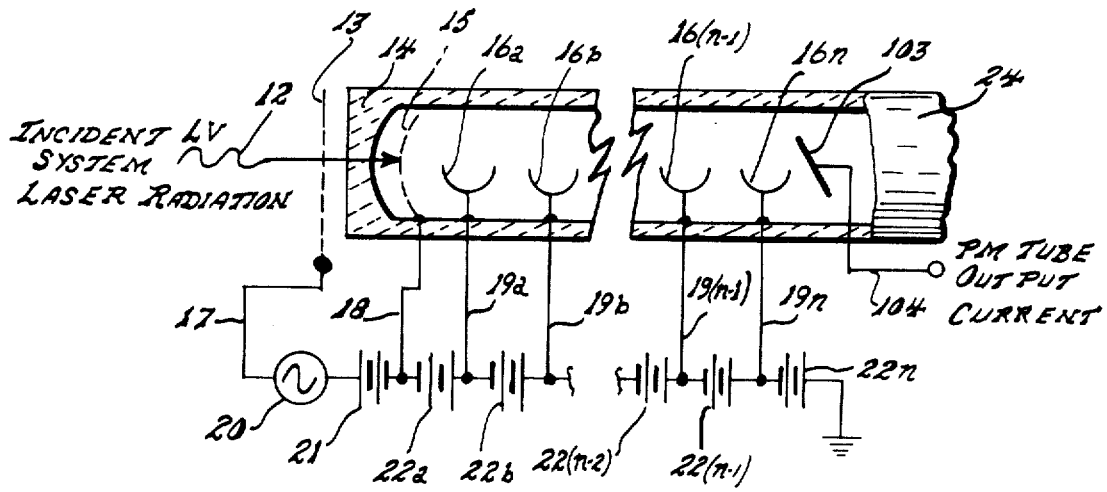
FIG. 2 shows an alternative arrangement of the control grid and photocathode of the photomultiplier tube.

FIG. 2 shows an alternative arrangement of externally positioned control grid 13. This arrangement requires no internal alteration of PM tube 24 as does that shown in FIG. 1. The incident radiation 12 passes through control grid structure 13, through the PM tube wall 14 and then impinges upon photocathode 15. Leads 17, 18 and 19a are the electrical connections to control grid 13, photocathode 15 and first dynode 16a, respectively. Static voltage source 21 biases the control grid 13 positive with respect to the photocathode 15 and tends to prevent photoelectrons from passing to the first dynode 16a. Static voltage source 22a tends to attract photoelectrons to first dynode 16a. Signal generator 20 tends to cause alternate repulsion and attraction of the photoelectrons by the control grid 13. This amplitude modulation of the photoelectron stream again causes an IF signal whose frequency can be maintained within the frequency response range of the PM tube anode R-C time constant. Control grid 13 may be a conventional type grid structure affixed to the exterior surface of wall 14. Tube 24 is conventional except for externally affixed grid 13 and includes dynodes 16a through 16n and associated voltage sources 22a through 22n, respectively.

FIG. 3 shows PM tube 24 or 100 with heterodyne control grid incorporated into a superheterodyne type signal conditioning instrument. The superheterodyne instrument is useful for LV system signal conditioning since outputs are available for determination of the instantaneous frequency, average frequency, the frequency deviation about the average, and the frequency deviation rate of input signal 23. These four parameters are required for calculation of certain turbulent flow parameters (i.e., turbulence intensity and scale of turbulence).

Three distinct operating modes are possible with the instrument shown in FIG. 3, depending upon the position of switch 32. Switch position 1 results in a "compression feedback" type circuit, and voltage controlled oscillator 36 frequency is made to automatically "track" the instantaneous input signal frequency. Switch position 2 results in an "average frequency tracking " type circuit and voltage controlled oscillator 36 frequency is made to automatically "track" the average input signal frequency. Switch position 3 produces a "manually tuned instrument" in which slow changes in the average frequency of the input signal are followed by manually tuning the oscillator 36.

The input signal 23 and the oscillator signal on line 37 are frequency heterodyned in the PM tube 24 to produce IF signal on line 25 which is introduced into IF amplifier 26. The IF amplifier output signal on line 27 is introduced into limiter 28 to produce a constant amplitude IF signal 29. The constant amplitude IF signal 29 drives the frequency discriminator 30 whose output is a voltage level proportional to the deviation of the IF signal frequency from the IF center frequency. The discriminator output on line 31 then drives either the wideband gain amplifier 33 or the low-pass gain amplifier 34 (depending upon the position of switch 32). The output on line 35 of amplifier 33 or 34 then drives voltage controlled oscillator 36 to maintain the IF signal on line 25 at the IF center frequency. It is noted that photomultiplier tube 100 may be utilized in place of tube 24.

With switch 32 in position 3, oscillator 36 is manually tuned to maintain the IF signal on line 25 at the IF center frequency.

FIG. 3 is a simplified diagram of a superheterodyne instrument incorporating a PM tube with a frequency heterodyne control grid; auxiliary instrumentation is required to determine average frequency, deviation about the average, and deviation rate.

What is claimed is:

1. A heterodyning photomultiplier tube apparatus in a laser velocimeter system comprising a photomultiplier tube including a glass wall for passage of an input laser signal therethrough, a photocathode receiving said input laser signal, said photocathode being positioned inside said photomultiplier tube, a dynode receiving electrons emitted from said photocathode, a control grid interposed between said photocathode and said first dynode, successive dynodes for electron multiplication, an anode positioned inside said photomultiplier tube, said anode collecting the electrons emitted from said dynode to provide an output signal, oscillator means external to said photomultiplier tube generating a preselected frequency to be fed to said control grid for injection into said photomultiplier tube for heterodyning with said input laser signal to provide a frequency difference signal as said output signal from said anode, said oscillator means being manually or voltage controlled, means to amplify the output signal from said photomultiplier tube, means to constant amplitude limit the amplified signal, frequency discriminator means receiving the limited signal, said frequency discriminator providing an output signal having a voltage level proportional to the deviation of the multiplier output signal frequency from the center frequency, a wideband gain amplifier operating as a frequency compression feedback circuit, a low pass gain amplifier operating as an average frequency tracking circuit, and means to selectively interconnect said oscillator means and said discriminator with said wideband amplifier or said low pass gain amplifier, said means to selectively interconnect also allowing said discriminator means to be disconnected to permit said oscillator to be manually tuned so that slow changes in the average frequency of the input signal are followed by manual tuning of said oscillator, said laser velocimeter system providing outputs to determine the average frequency of said input laser signal, the frequency deviation about the average, and the frequency deviation rate.

2. A heterodyning photomultiplier tube apparatus in a laser velocimeter system comprising a photomultiplier tube including a glass wall for passage of a laser signal therethrough, said glass wall having an exterior surface, a photo-cathode positioned inside said photomultiplier tube and receiving said laser signal passing through said glass wall and operating to emit electrons in response thereto, a first dynode receiving electrons from said photocathode and emitting further electrons therefrom, successive dynodes for electron multiplication, an anode collecting electrons emitted from said dynodes to provide an output signal, a control grid structure affixed to said exterior of said glass wall, said control grid structure receiving an input laser signal for passage through said glass wall, oscillator means generating a preselected frequency signal to be fed to said control grid, said oscillator means being external to said photomultiplier tube, said anode providing as said output signal a signal being the frequency difference between said input laser signal and said preselected frequency signal, said oscillator means being manually or voltage controlled, means to amplify the output signal from said photomultiplier tube, means to constant amplitude limit the amplified signal, frequency discriminator means receiving the limited signal, said frequency discriminator providing an output signal having a voltage level proportional to the deviation of the multiplier output signal frequency from the center frequency, a wideband gain amplifier operating as a frequency compression feedback circuit, a low pass gain amplifier operating as an average frequency tracking circuit, and means to selectively interconnect said oscillator means and said discriminator with said wideband amplifier or said low pass gain amplifier, said means to selectively interconnect also allowing said discriminator means to be disconnected to permit said oscillator to be manually tuned so that slow changes in the average frequency of the input signal are followed by manual tuning of said oscillator, said laser velocimeter system providing outputs to determine the average frequency of said input laser signal, the frequency deviation about the average, and the frequency deviation rate.

* * * * *